(12) United States Patent
Tow et al.

(10) Patent No.: US 8,539,050 B2
(45) Date of Patent: Sep. 17, 2013

(54) METHOD FOR DISTRIBUTING UPDATE MODULES FOR COMPUTER SOFTWARE OVER A NETWORK

(75) Inventors: Timothy N. Tow, Huntsville, AL (US); Amelia C. Tate, Huntsville, AL (US)

(73) Assignee: Applied OLAP, Inc., Huntsville, AL (US)

( * ) Notice: Subject to any disclaimer, the term of this patent is extended or adjusted under 35 U.S.C. 154(b) by 948 days.

(21) Appl. No.: 12/110,980

(22) Filed: Apr. 28, 2008

(65) Prior Publication Data

US 2009/0271777 A1 Oct. 29, 2009

(51) Int. Cl.
*G06F 15/177* (2006.01)

(52) U.S. Cl.
USPC ............................. 709/221; 717/176; 717/171

(58) Field of Classification Search
USPC .................................................. 709/221–225
See application file for complete search history.

(56) References Cited

U.S. PATENT DOCUMENTS

| | | | | |
|---|---|---|---|---|
| 6,546,553 B1* | 4/2003 | Hunt | ............................... | 717/174 |
| 7,007,159 B2* | 2/2006 | Wyatt | ................................. | 713/1 |
| 7,188,163 B2* | 3/2007 | Srinivasan et al. | ............ | 709/221 |
| 7,676,665 B2* | 3/2010 | Wyatt | ................................. | 713/1 |
| 8,095,923 B2* | 1/2012 | Harvey et al. | ................. | 717/171 |
| 8,266,670 B1* | 9/2012 | Merkow et al. | ..................... | 726/1 |
| 2003/0097426 A1* | 5/2003 | Parry | ............................. | 709/220 |
| 2003/0101245 A1* | 5/2003 | Srinivasan et al. | ............ | 709/221 |
| 2003/0217255 A1* | 11/2003 | Wyatt | ............................. | 713/100 |
| 2005/0273667 A1* | 12/2005 | Shrivastava et al. | ............ | 714/38 |
| 2006/0020936 A1* | 1/2006 | Wyatt | ............................. | 717/162 |
| 2006/0036715 A1* | 2/2006 | Ghattu | ........................ | 709/220 |
| 2006/0107256 A1* | 5/2006 | Zarenin et al. | ................ | 717/127 |
| 2006/0117171 A1* | 6/2006 | Chen | ................................. | 713/2 |
| 2006/0265481 A1* | 11/2006 | Seitz et al. | ..................... | 709/222 |
| 2006/0265688 A1* | 11/2006 | Carlson et al. | ................ | 717/101 |
| 2006/0288300 A1* | 12/2006 | Chambers et al. | ............ | 715/744 |
| 2007/0179957 A1* | 8/2007 | Gibson et al. | .................... | 707/10 |
| 2008/0109801 A1* | 5/2008 | Levine et al. | .................. | 717/171 |
| 2008/0288547 A1* | 11/2008 | Brodsky et al. | ............... | 707/200 |
| 2009/0037912 A1* | 2/2009 | Stoitsev et al. | ................ | 718/100 |

* cited by examiner

*Primary Examiner* — Ninos Donabed
(74) *Attorney, Agent, or Firm* — David E. Mixon; Stephen H. Hall; Bradley Arant Boult Cummings LLP

(57) ABSTRACT

A method for distributing update modules for computer software has been developed. The method includes requesting and receiving a list of updated software modules stored on a network server. The user then determines if each updated module is presently installed on the user's system. If the updated module is not installed, the user requests a runtime artifact from the server for the module which is then installed on the user's system.

5 Claims, 2 Drawing Sheets

METHOD FOR DISTRIBUTING UPDATE MODULES FOR COMPUTER SOFTWARE OVER A NETWORK

FIELD OF THE INVENTION

The invention relates generally to computer software. More specifically, the present invention relates to a method for distributing update modules for software over a network.

BACKGROUND ART

Since the advent of personal computers that are networked together, distribution of software to multiple computer workstations has been a challenge. Before computers were networked, software was often physically installed, in person, by a computer administrator. As computers came to be connected via a network, software evolved to be delivered over a network.

As technology continued to evolve as the primary source of information for business users, the Internet was invented and became a primary source of moving information; it also became the delivery mechanism for installed software. This progress did not come without a cost. Viruses, which intentionally caused computers to malfunction, became common. In response to the troubles caused by these viruses, security on personal computers was tightened making it again more difficult to distribute software.

Since that time, there have been two major different methodologies developed for distributing applications that attempt to solve these problems: Hypertext Markup Language ("html"); and smart-client. The smart-client solutions, in both Microsoft .Net and Java protocols, work using a codebase that is securely installed on a client workstation using HyperText Transfer Protocol ("HTTP") as the transport. Once installed, they commonly communicate with servers via HTTP to get the metadata about the application. They also use HTTP to obtain data or reports requested by the user.

Further, one of the tenets of software written to be used in a Software as a Service ("SaaS") environment dictate that the software itself be extremely configurable via application metadata to specify properties used to configure the running application. In the SaaS software model, a SaaS provider writes an application where a single executing instance may be licensed to thousands of users for simultaneous usage from a central server. SaaS applications run the exact same program code but behave differently for each of the users of the software. The differences in behavior are caused by different property values being stored for each user. The property values are stored in a relational database on the server and user interface used by those business users is typically a web-based application. The relational database information for each customer are segregated in the relational databases either by storing each companies data in a separate database or by using a database table keying structure that segregates the data for each tenant within the same database. The relational database schemes for such SaaS applications are normally very complex in order to both provide the functionality and segregate the metadata driving the application by tenant.

SUMMARY OF THE INVENTION

In some aspects, the invention relates to a method for distributing update modules for computer software, comprising: sending a first query request from a network client for a list of update modules stored on a server; receiving the first query request at the server and sending a response to the network client comprising a list of update modules stored on a server; testing to determine if each update module is installed on the network client; sending a second query request to the server from the network client for a runtime artifact for an update module that is not installed on the network client; receiving the second query request at the server and sending a response to the network client comprising a runtime artifact for the updated module that is not installed on the network client; and installing the runtime artifacts in corresponding runtime directories on the network client.

In other aspects, the invention relates to a method for storing updated modules for computer software, comprising: creating a runtime artifact for the updated module comprising metadata and a unique checksum; encoding the runtime artifact in a data string; transporting the runtime artifact to a server; storing the runtime artifact on a relational database located on the server; and confirming the successful storage of the runtime artifact to a user.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The present invention applies specifically to smart-client applications written using the Microsoft .Net Framework and distributed using the Microsoft ClickOnce technology to deploy the application via a web-service. ClickOnce technology involves staging the runtime code modules (i.e., .exe and/or .dll files) on a web server with digitally signed metadata that assures the safety of the code. This assurance allows ClickOnce applications to be easily installed regardless of the security level of the individual computer user requesting the software be installed.

Method for Module Distribution

The methods of the present invention are integrated into the application framework of the invention. One embodiment of the present invention is a Microsoft NET smart-client application that displays behavior controlled by basic configuration metadata distributed as part of the ClickOnce deployment. Other portions are also controlled by 'parameter' metadata stored on the relational server. This 'parameter' metadata includes, but is not limited to, information on the reports available to users, the ways the users may select report parameters, and information related to the database connection.

The method on this embodiment of the invention relates to extending that functionality to more easily enable administrators using the invention to create their own 'add-in' modules allowing them to deploy highly tailored functionalities to their users. The add-in modules being deployed consist of one or more code modules (.dll's) along with one or more accompanying "Object Type Configuration" XML files. The functionality exposed by the modules is highly variable. One example of a functionality for which an administrator may use a code module is to perform custom cost allocations as part of a budgeting system.

In this embodiment of the invention, each code class and it's enclosing module that is delivered as part of the framework is typically defined in a configuration file known as the "Object Type Configuration" file. This file, in XML format, maps the module class and file names to the common name the administrator will use to map the application's behavior in the built-in Metadata Editors.

Figure 1:
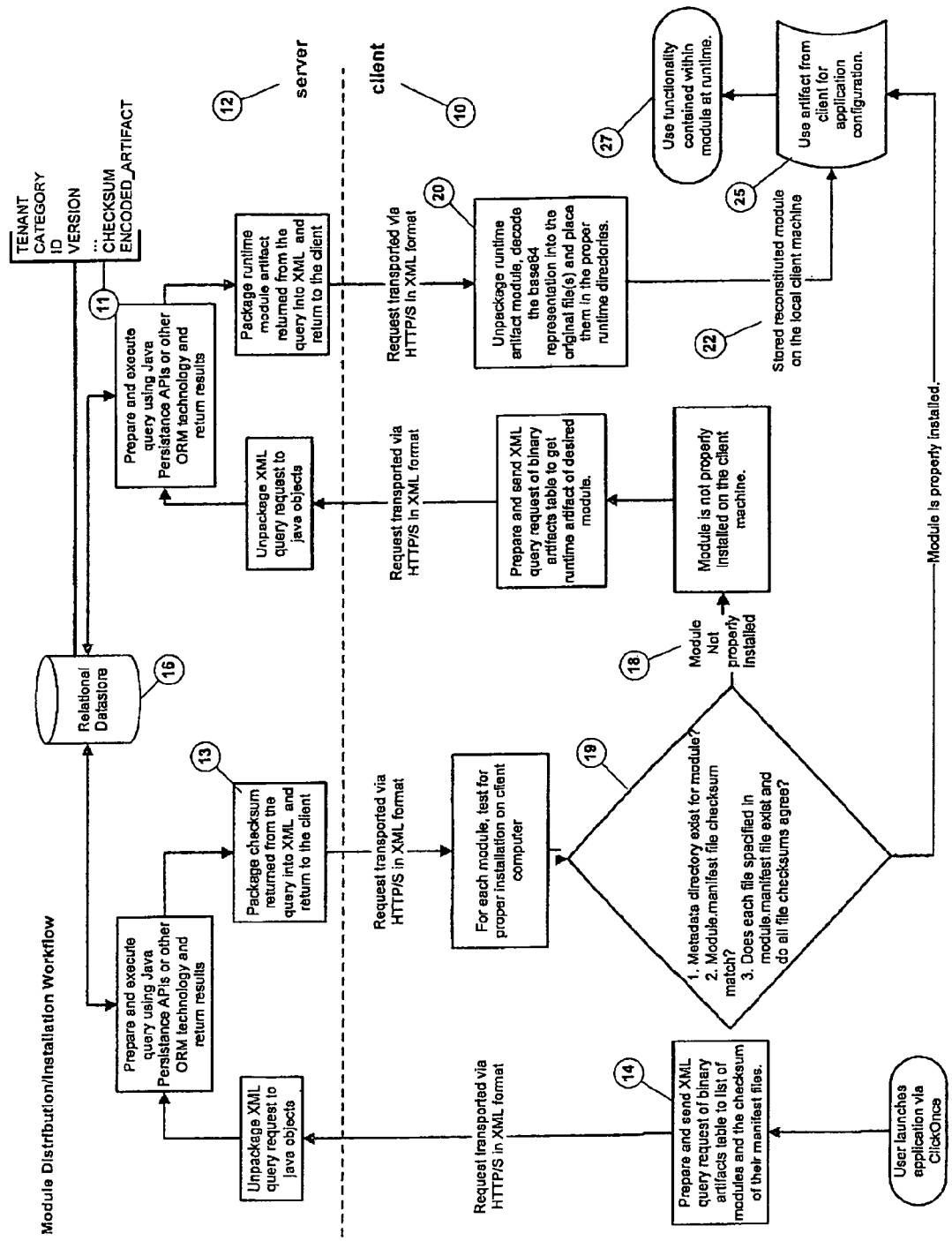
FIG. 1 shows a flowchart depicting a method for module distribution in accordance with one embodiment of the present invention.
Figure 2:
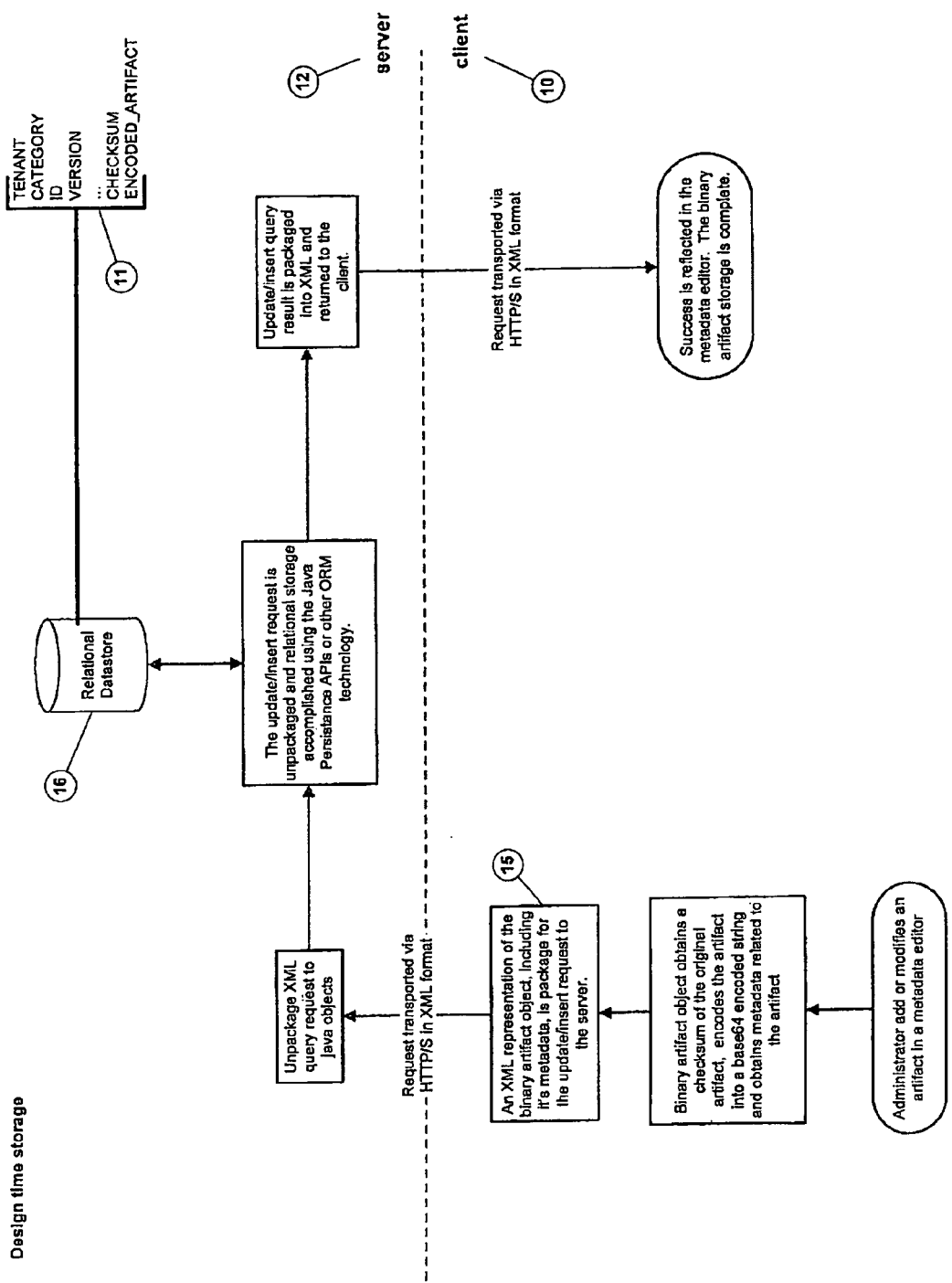
FIG. 2 shows a flowchart depicting a method for saving design data for an application in accordance with one embodiment of the present invention.

FIG. 1 shows a flowchart depicting an example of this method of module distribution. Once the administrator or developer has completed a module, the files are packaged in a "Modules Metadata" XML file 1313 inside the Modules Metadata Editor. The XML file 1313 contains each of the files in the module encoded into a base 64 string along with accompanying metadata about the file itself. The XML file is then transported via HTTP to the server for storage in a relational database 16.

Once the module is stored in the relational database server 16, it will be available in the various metadata editors where the administrator may choose to utilize the new module. Once the administrator utilizes the new module and publishes revised metadata containing that module, the module is distributed to the user desktops upon first usage.

Upon program startup, a query is made to the relational server seeking summary information about available modules for the application 14. Each module returned is then analyzed 19 to determine if the module files have been downloaded from the server and installed in the client computers application directory for the running application.

If the module is found not to be previously installed 18, the module is downloaded and the individual files comprising the module are deserialized from base 64 encoding back to their original state and installed in the proper place in the client computers application directory 20. A module manifest describing the installed files is generated in XML format and also stored in the client computer's application directories 22.

If the module is found to exist, the files listed in the module manifest are tested to determine if they are identical to the files information contained in the module manifest 19. If the files do not match the manifest, the files are reinstalled from the server to the client. The application then reads the "Object Type Configuration" XML file(s) installed as part of the module and are, that point, available to be instanced and used by the application 25.

At runtime, module information read from the "Object Type " XMLXML file installed on the desktop 27, including an object type identifier, a fully qualified class name, and the full assembly (dll) name is used to locate, load and use the class containing custom add-in functionality.

Method of Design Storage

Another embodiment of the present invention described here applies to a unique simplified relational database design for servicing application metadata requests and, separately, a unique methodology used to identify, deploy, and instance "add-in", or customization, modules at runtime using Extensible Markup Language ("XML") using HTTP as the transport mechanism.

The metadata to drive the application is stored in a relational database 16 and is requested by the smart client 10 running on the desktop using HTTP to transport the metadata 1515 in XML format. On the server 12, the design storage method uses a unique, simplified design to store the metadata to drive the application in a single table 11.

The metadata used by the present invention application consists of many different types of files including: Excel spreadsheet files; .xml definition files; executable add-in object code files; and even personalized views saved by end users at runtime. These files, known as "artifacts", are stored in the same database table regardless of type and usage. The two elements that make this possible are the unique keying structure used by the present invention along with storage of the actual artifact in an encoded string format.

The metadata to drive the application is stored in a relational database and transferred to the smart client running on the application desktop using http/s ("Hypertext Transfer Protocol over Secure Socket Layer") to transport the metadata in XML format. On the server, the present invention uses a unique, simplified design to store the metadata to drive the application in a single table.

The keying structure encompasses all of the elements needed to uniquely identify any piece of metadata associated with the application. Each distinct artifact is stored as a separate record in the database using a key that consists of four separate fields: tenant; category; ID; and version. The tenant data relates to a string that uniquely defines a set of metadata in the database. Examples tenant codes may look like this:
 a. SAMPLE
 b. BUDGETING
 c. REPORTING
 d. ABC COMPANY The category codes are defined in the application and may vary by application. Examples of category codes may include:
 a. ESSBASE_CONNECTION
 b. ESSBASE_CONNECTIONS
 c. GENERAL
 d. HIERARCHIES
 e. HIERARCHY
 f. MODULE
 g. SELECTOR
 h. SELECTORS
 i. SELECTOR_LIST
 j. SELECTOR_LISTS
 k. SMART_CLIENT_APPLICATION
 l. TOOLBARS_CONFIGURATION
 m. TOOLBARS_CONFIGURATIONS
 n. VIEW
 o. VIEWS
 p. VIEW_PROPERTY_SET
 q. VIEW_PROPERTY_SETS
 r. WORKBOOKSCRIPT
 s. WORKBOOKSCRIPTS.

The ID is a unique name for an object in a category. Examples of ID's include:
 a. 3_Product
 b. ADMIN
 c. AO_Web
 d. Adhoc
 e. BuildRangesFromScripts.

Finally, the version is the sequential version number for the artifact.

The actual artifact is stored in the 'encoded artifact' field of the record in the database. The 'encoded artifact' field is a 'Character Large Object' ("CLOB") field which allows a string of very large size to be stored. The string being stored is a compressed, base 64-encoded representation of the original file. The original file may be in binary format or text format. The artifacts table also has a checksum field that enables intelligent client side caching of metadata elements and reduces bandwidth usage. A checksum is an algorithm-based method of determining the integrity and authenticity of a digital data object. It is used to check whether errors or alterations have occurred during the transmission or storage of an artifact.

While the invention has been described with respect to a limited number of embodiments, those skilled in the art, having benefit of this disclosure, will appreciate that other embodiments can be devised which do not depart from the scope of the invention as disclosed here. However, an exemplary claim is included to provide a written description of one embodiment of the present invention.

What is claimed is:

1. A method for distributing updated executable add-in modules for computer software, comprising:

sending a first query request from a network client for a list of updated executable add-in modules stored on a server;

receiving the first query request at the server and sending a response to the network client comprising the list of updated executable add-in modules stored on the server;

testing to determine if each updated executable add-in module on the list is installed for a pre-existing software application on the network client, where the testing comprises using a checksum value stored on the server;

sending a second query request to the server from the network client for a module package comprising, an xml representation of a dynamically loaded library module, and an xml representation of a related metadata describing an executable content of a dynamically loaded library module, for an updated executable add-in module that is not installed on the network client;

receiving the second query request at the server and sending a response to the network client comprising the module package comprising, the xml representation of the dynamically loaded library module, and the xml representation of the related metadata describing the executable content of the dynamically loaded library module, for the updated executable add-in module that is not installed on the network client;

decoding and installing the module package, comprising a runtime dynamically loaded library module in machine code format and the xml representation of the related metadata describing the executable content of the dynamically loaded library module, in corresponding runtime directories on the network client;

where the module package comprises a tenant field that uniquely defines a set of metadata for the module package and the updated executable add-in module;

where the module package comprises a category field that identifies the category of metadata for the module package and the updated executable add-in module;

where the module package comprises an identification field that is a unique name for an object in a category of metadata for the module package and the update executable add-in module; and where the updated executable add-in module is a compressed, base 64-encoded representation of the dynamically loaded library module in machine code format along with the xml representation of the related metadata describing the executable content of the dynamically loaded library module.

2. The method of claim 1, where the first query request, second query request, and responses are transported via HTTP/S in XML format.

3. The method of claim 1, where the installation of the updated executable add-in module on the network is determined by checking the existence of a metadata directory.

4. The method of claim 3, where the installation of the updated executable add-in module on the network is further determined by checking to see if the checksum value of the module package match a module manifest file.

5. The method of claim 1, wherein the module package comprises a version that is a sequential version number for the module package and for the updated executable add-in module.

\* \* \* \* \*